US009125236B2

(12) United States Patent
Vandwalle et al.

(10) Patent No.: US 9,125,236 B2
(45) Date of Patent: Sep. 1, 2015

(54) METHOD AND APPARATUS FOR COOPERATIVE CHANNEL SWITCHING

(71) Applicant: Apple Inc., Cupertino, CA (US)

(72) Inventors: Pierre B. Vandwalle, San Francisco, CA (US); Tashbeeb Haque, San Francisco, CA (US); Andreas Wolf, San Mateo, CA (US); Saravanan Balasubramaniyan, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 151 days.

(21) Appl. No.: 13/913,278

(22) Filed: Jun. 7, 2013

(65) Prior Publication Data

US 2014/0362726 A1 Dec. 11, 2014

(51) Int. Cl.
*H04L 12/28* (2006.01)
*H04W 84/18* (2009.01)
*H04W 4/06* (2009.01)
*H04W 56/00* (2009.01)
*H04W 4/00* (2009.01)
*H04B 7/00* (2006.01)
*H04W 8/00* (2009.01)

(52) U.S. Cl.
CPC ............... *H04W 84/18* (2013.01); *H04W 4/06* (2013.01); *H04W 56/001* (2013.01); *H04W 8/005* (2013.01)

(58) Field of Classification Search
CPC ..... H04W 84/18; H04W 4/06; H04W 56/001; H04W 8/005
See application file for complete search history.

(56) References Cited

U.S. PATENT DOCUMENTS

| 8,385,305 | B1 * | 2/2013 | Negus et al. ................. | 370/338 |
|---|---|---|---|---|
| 2010/0135226 | A1 * | 6/2010 | Chandramouli et al. ..... | 370/329 |
| 2010/0232310 | A1 * | 9/2010 | Hu ............................... | 370/252 |
| 2013/0132501 | A1 * | 5/2013 | Vandwalle et al. ........... | 709/208 |
| 2013/0132502 | A1 * | 5/2013 | Stacey et al. ................. | 709/208 |
| 2013/0185373 | A1 * | 7/2013 | Vandwalle et al. ........... | 709/208 |

* cited by examiner

*Primary Examiner* — Clemence Han
(74) *Attorney, Agent, or Firm* — Park, Vaughan, Fleming & Dowler LLP

(57) ABSTRACT

An apparatus and methods are provided for opportunistically conducting data communications on multiple wireless channels. In these methods, a device is engaged in data communications with a second device and receives a conflicting communication demand requiring action on one or more channels other than the data-communication channel (e.g., to conduct a channel scan, to issue or receive a beacon). The device arranges a schedule of channel switches to satisfy the communication demand and advises the second device of the schedule, and may explicitly invite the second device to implement the schedule. To the extent the second device does so, the data communications continue on the other channels. The devices may be participating in a synchronized peer-to-peer communication environment that requires their attendance on the data-communication channel and that is not associated with the other channels.

20 Claims, 8 Drawing Sheets

METHOD AND APPARATUS FOR COOPERATIVE CHANNEL SWITCHING

RELATED APPLICATIONS

The subject matter of the present application is related to subject matter of the following co-pending non-provisional U.S. patent applications: (a) application Ser. No. 13/625,752, entitled "Selection of a Master in a Peer-to-Peer Network Environment" and filed 24 Sep. 2012; (b) application Ser. No. 13/625,766, entitled "Synchronization of Devices in a Peer-to-Peer Network Environment" and filed 24 Sep. 2012; (c) application Ser. No. 13/657,707, entitled "Selection of Synchronization Stations in a Peer-to-Peer Network Environment" and filed 22 Oct. 2012; and (d) application Ser. No. 13/736,725, entitled "Group Formation Within a Synchronized Hierarchy of Peer-to-Peer Devices" and filed 8 Jan. 2013. The preceding patent applications are incorporated herein by reference.

BACKGROUND

Apparatus and methods are provided for efficiently conducting peer-to-peer communications.

Peer-to-peer network protocols or technologies allow individual nodes or devices to communicate directly with other peers, and may be contrasted with infrastructure-based environments in which a required central node (e.g., a server, a router, a switch, an access point) passes communications between different nodes. One benefit of direct peer-to-peer communication is that it avoids unnecessary additional routing and processing of communications through other devices.

However, existing peer-to-peer network technologies have limitations that diminish their usability, scalability and/or performance. For example, some technologies offer only limited peer-to-peer communication capabilities because they are focused on infrastructure-based solutions and therefore require a central node. Peer-to-peer communication in these environments requires negotiation with the central node, and may not be possible between devices that do not share a common central node. Also, communications between peers may be limited by the capabilities of the central node (e.g., frequency band, bandwidth, modulation).

Because of its prominent role, a central node may become congested and thus increase communication latency and decrease communication throughput within the environment. Further, a central node acts as a single point of failure. Even if another node can take over the functions of a failed or missing central node, until that occurs the network may be severely degraded.

Some other technologies that allow for peer-to-peer communications require significant power consumption by individual nodes, which is a principal concern for devices that rely on battery power (e.g., smart phones, tablets, laptop and notebook computers). Excessive power consumption by a peer might be caused by inefficient discovery of services and/or other devices, by having to act as a central node, by inefficient use of the device's transceiver, and/or for other reasons. For example, requiring a device to continually or regularly poll or query other devices will cause it to consume significant amounts of power, especially for a wireless device travelling through different spatial regions.

Further, some networking technologies or protocols that support peer-to-peer communications do not coexist well with other technologies. For example, in a wireless environment, typical peer-to-peer protocols are not flexible enough to share a device's radio, antenna or frequency spectrum with other protocols or between applications (e.g., to maintain a Bluetooth® connection), or to share such a resource efficiently. When the communication resource is subject to competing requests from different functions, typically it is allocated to one request at a time, thereby diminishing throughput or other performance metrics of competing functions.

SUMMARY

In some embodiments, apparatus and methods are provided for efficient communications among peers in a wireless peer-to-peer network environment. In these embodiments, when a shared communication resource of a device (e.g., radio, antenna) is requested by multiple different functions or applications, including a data transfer operation, the resource is allocated according to a schedule that allows the data transfer to continue even while satisfying a competing demand.

In some implementations, for example, when the resource is needed to allow the device to scan one or more communication channels (e.g., to locate nearby networks, to discover stations and/or services), a partner in an on-going data transfer is advised of a schedule of frequency changes. If the partner station is able to accommodate some or all of the changes, the device and the partner continue their data transfer even while the device tunes to other channels and conducts an active or passive scan.

In some embodiments, participants in a peer-to-peer environment, including the device, arrange themselves into a logical hierarchy anchored by a root synchronization (or root sync) station responsible for maintaining synchronization among the peer devices so that they can discover and communicate with each other. The hierarchy includes any number of subordinate branch synchronization (or branch sync) stations that facilitate the root sync station's synchronization of the hierarchy; all other devices are leaf stations. Some or all devices issue synchronization frames to achieve and maintain synchronization among the members of the hierarchy.

Each peer device must occasionally tune to a social channel to receive a synchronization frame and may also be required to rendezvous with other devices on the same or different channel. These requirements may conflict with other demands on a device's radio, such as those issued by particular applications or services (e.g., Bluetooth®). Thus, at any time, a peer device's radio may be subject to what would normally be mutually exclusive demands and that could hinder the throughput of data exchanges with peer devices.

DETAILED DESCRIPTION

Figure 1:
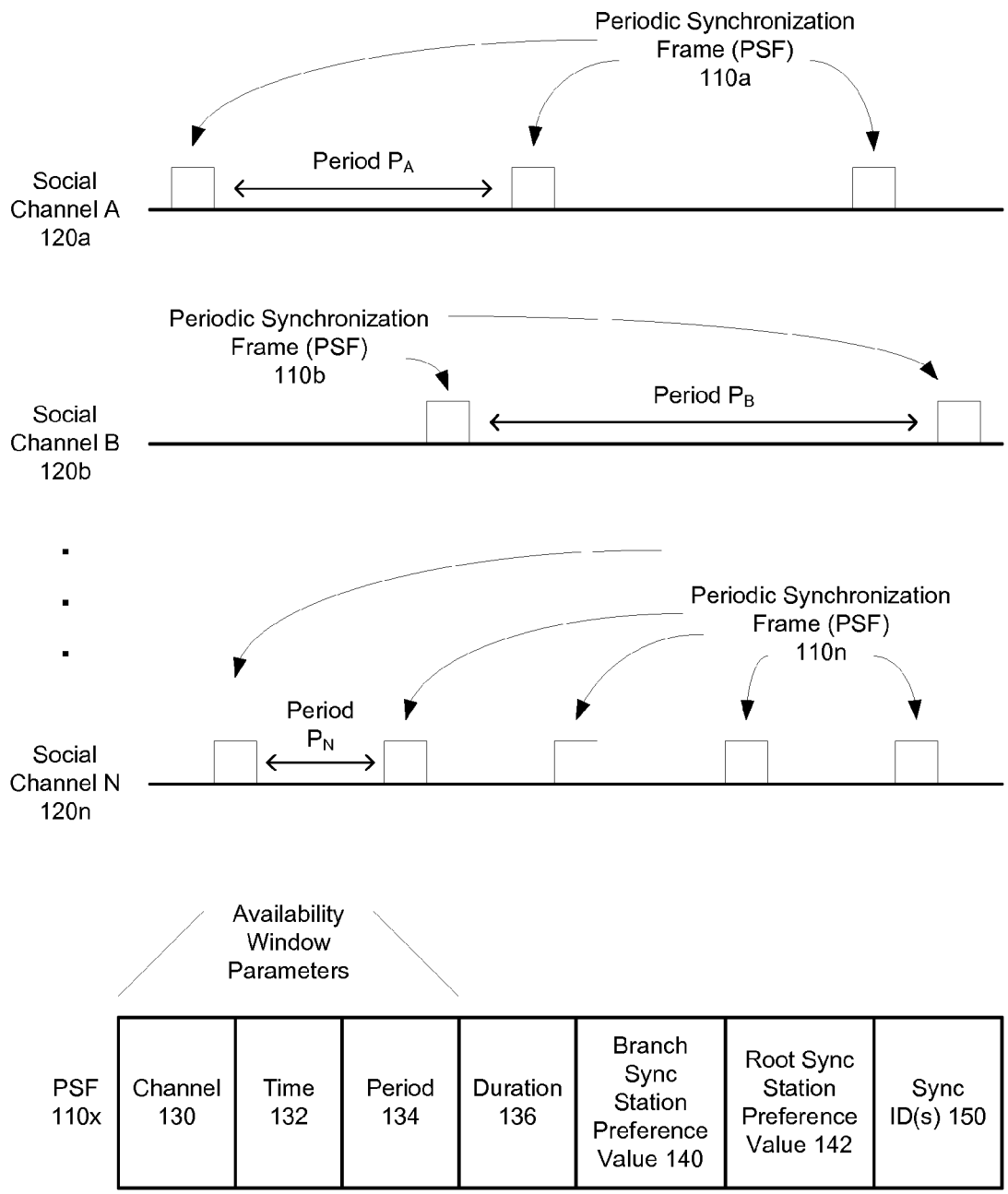
FIG. 1 depicts the use of periodic synchronization frames for achieving and maintaining synchronization among devices, according to some embodiments.

The following description is provided in the context of a particular application and its requirements. Various modifications to the disclosed embodiments will be readily apparent to those skilled in the art, and the general principles defined herein may be applied to other embodiments and applications.

In some embodiments, apparatus and methods are provided for efficiently conducting peer-to-peer communications while satisfying multiple competing demands on a mobile device's shared communication resources. In these embodiments, the device participates in a synchronized peer-to-peer networking environment, and also hosts applications and/or services that have their own communication requirements, such that at different times the device must use those resources for different purposes.

When a device must interrupt an ongoing data exchange (e.g., a file transfer, a game) to satisfy a competing demand, the device plans a sequence of frequency/channel changes to accommodate the demands. The partner(s) in the data exchange are advised of the schedule so that they may accompany the device (i.e., meet the device on one or more of the channels).

As the device conducts the frequency changes, and depending on the nature of the communication demand being accommodated, the device and the partner(s) can continue their data exchange, to the extent that the partner(s) were able to match the sequence. For example, if the device is conducting a channel scan (either active or passive), issuing or receiving a beacon, or conducting some other non-intensive communications, it will be able to continue the data exchange during some of the time it is tuned to a channel on which those non-intensive communications are conducted.

Introduction

A peer-to-peer wireless communication environment may be characterized by any number of devices of the same type and/or different types—such as smart phones, tablets, personal digital assistants, laptop and desktop computers and so on. Different devices will have different features, may execute different applications, may have different power levels (e.g., battery strengths), different communication needs, different loads (e.g., on a processor, on an antenna), may be heard by other devices with varying signal strengths, etc. In addition, the communication environment may be fluid, with devices continuously entering, moving through and exiting the spatial region encompassing the environment.

Some embodiments disclosed herein enable devices in such an environment to discover each other and to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points) while maintaining compatibility with infrastructure-based technologies; easily and quickly recover if and when a device acting as a synchronization station (or master) exits the environment; and are scalable to accommodate dense environments having many devices. These and other features and advantages are described below.

In some embodiments, devices are synchronized so that they rendezvous at predetermined times on predetermined channels. A period of time during which devices rendezvous is termed an availability window, and all synchronization (or sync) stations may advertise the same, or similar, schedules of availability windows. For example, one device may identify a subset of a larger set of availability windows advertised by other devices. During an availability window, peers may exchange multicast and/or unicast data communications, and discover other devices and services.

Parameters of one or more upcoming rendezvous (e.g., time and channel) are communicated via Periodic Synchronization Frames (PSFs) that are broadcast on one or more social channels. Devices are pre-programmed to periodically listen on at least one social channel, for a length of time sufficient to hear at least one PSF.

When a device boots or moves into an environment of peer devices, it will tune to a predetermined social channel and quickly learn where and when it may rendezvous with other devices. If the device does not hear a PSF, it may assume that it should act as a master and begin issuing its own PSFs to facilitate synchronization with other devices that may be present or that later appear.

Synchronization parameters (e.g., a schedule of upcoming availability windows) may also be announced during an availability window in some implementations, thereby saving the devices the expense of switching their radios to a social channel to receive the parameters. A device may even power off its radio when not listening for a PSF, participating in an availability window, communicating directly with a peer or using it for some other purpose.

A device participating in a synchronized hierarchy may therefore share a radio, antenna and/or other communication resource(s) with other functions of the device, such as an infrastructure connection or a Bluetooth® link. However, the communication requirements of the synchronized peer-to-peer environment—such as periodically tuning to a social channel to receive a PSF, and attending availability windows on rendezvous channels—may conflict with other demands for those resources.

Within a community of peer devices, a selection procedure is applied to determine which devices will become sync stations and take over responsibility for synchronizing other devices. The number of synchronization stations selected may depend on the number of peer devices present, their signal strengths, signal propagation patterns, operating parameters, etc.

Although devices in the communication environment engage in peer-to-peer communications without the burden of infrastructure requirements, the selection of synchronization stations or masters will logically organize the devices into a hierarchy for purposes of synchronization. Within the hierarchy, a root sync station (or "top master") is responsible for overall synchronization of the devices via synchronization parameters conveyed by the PSFs it broadcasts. Each subordinate master, called a branch sync station, synchronizes with the root sync station or an intervening branch sync station, and retransmits or repackages the root sync station's synchronization parameters within its own PSFs, thereby extending the range of the overall synchronization. Other devices participating in the hierarchy become leaf stations.

The radio range of a single wireless device (e.g., the root sync station) is limited, which would normally prevent that device from organizing devices beyond a local region. Requiring subordinate branch sync stations to rebroadcast its synchronization parameters allows that single wireless device to synchronize a collection of devices spread over a larger area. The entire community enjoys the resulting benefits (e.g., ready discovery of services and other devices, less power consumption).

Unlike an environment that has infrastructure requirements (e.g., requiring coordination via an access point), because a synchronization station's principal task is simply to disseminate rendezvous parameters, loss of a sync station is easily rectified. For example, the rendezvous schedule published by the missing sync station will simply be maintained while a replacement is chosen, thereby keeping all devices synchronized. And, that replacement will generally maintain the same schedule.

Different algorithms for selecting synchronization stations, or masters, may be applied at different times and/or in different environments, but generally serve to promote any or all of these objectives: even spatial distribution of masters throughout the environment, a tunable density of masters within the environment and control of the size of the geographic area comprising the environment.

In some embodiments, an algorithm for selecting or identifying masters is executed regularly to ensure the most appropriate devices act as synchronization stations, based on various metrics or attributes of the devices. The selection process may also consider how many sync stations are already present in an area, how many sync stations a given peer device can hear, how far away they are (e.g., based on signal strength or some other measure of distance), etc.

Groups of devices within an environment may synchronize among themselves, separate from or in parallel with a larger, default, hierarchy. They may organize to share a file or execute a common application, for example. A group may mimic the default hierarchy and maintain internal synchronization by selecting a group root sync station (or "top group master") and one or more branch sync stations (or "group masters"), with the other devices (i.e., leaf or slave devices) synchronizing to the selected branch synchronization stations. A group root sync station may synchronize with (or attempt to synchronize with) a member of a nearby or surrounding default hierarchy.

Not all members of a group need be drawn from a single hierarchy. For example, in a spatial area adjacent to multiple hierarchies, a group may draw members from two or more of the hierarchies.

In some embodiments, a "default" hierarchy is a hierarchy that may comprise a relatively large number of devices (e.g., all devices within a given spatial area). Members of a default hierarchy will have (and advertise) matching "default" identifiers. A "group" hierarchy is composed of members of a private group. Members of a group hierarchy will have (and advertise) matching "group" identifiers.

Although all members of a group will typically also belong to a default hierarchy, individual members of a default hierarchy may or may not be members of any group hierarchy. Default and group identifiers are distinguishable from other device identifiers (e.g., IP address, MAC address, IMEI number, IMSI number).

Sections that follow discuss synchronization of devices within the peer-to-peer environment to form a default hierarchy, cooperative channel switching that supports opportunistic data communications, and an illustrative peer device, according to some embodiments.

Synchronization of Devices

As discussed above, synchronization of devices within a wireless communication environment according to some embodiments allows them to easily discover each other, identify available services and engage in direct peer-to-peer communications (unicast and/or multicast), all while conserving power resources and coexisting with other communication processes and functions.

Synchronization commences as soon as a device comes online or moves within range of at least one other device operating a compatible protocol, and can be maintained as long as the device is online within the spatial area covering the synchronized devices (e.g., as long as it is in range of a peer device).

Through synchronization and a master selection process, devices are automatically organized into a hierarchy, in which synchronization stations (or masters) at each level (or stratum) of the hierarchy periodically broadcast synchronization parameters in order to achieve and maintain synchronization among devices in an area. Periodic synchronization frames (PSFs) are one mechanism for disseminating synchronization parameters, and are consumed by all synchronized devices.

Periodic synchronization frames serve to convey information such as, but not limited to, information for synchronizing devices' clocks, a description of one or more upcoming availability windows during which synchronized devices can rendezvous, schedules of upcoming PSFs and/or availability windows, and metrics or attributes of the root sync station and the branch sync station that transmitted the PSF. In other embodiments, a PSF may include a different collection of information, but will normally include criteria identifying at least one availability window.

Formation of a hierarchy and synchronization of devices within it may be affected by configuration or operating parameters such as, but not limited to: a maximum depth or stratum of the hierarchy, periodicity of PSFs, number of synchronization stations (e.g., overall and/or within range of a given device), the selection algorithm used to select sync stations, device metrics or attributes considered by the selection algorithm, etc. In different embodiments, different parameters may be applied. U.S. patent application Ser. No. 13/657,707, entitled "Selection of Synchronization Stations in a Peer-to-Peer Network Environment" and filed Oct. 22, 2012 discloses methods of selecting master stations in a peer-to-peer network and is incorporated herein by reference.

FIG. 1 depicts periodic synchronization frames used to achieve and maintain synchronization among peer devices, according to some embodiments.

In these embodiments, periodic synchronization frames 110 (e.g., frames 110a, 110b, 110n) are transmitted on regular bases on one or more social channels 120 (e.g., channel A 120a, channel B 120b, channel N 120n).

Different sync stations may transmit periodic synchronization frames on the same or different social channels, and any given sync station may use one or more social channels to carry its PSFs. Different sync stations in a single environment may use different social channels, perhaps to avoid interference with each other, because the social channel used by one master may be in use by a different master for a different purpose (e.g., an infrastructure connection), and/or for some other reason. Availability windows may or may not be conducted on social channels.

Although multiple social channels 120 are depicted in FIG. 1, in some implementations all master stations in one environment and hierarchy may use the same social channel. Social channels and/or other channels discussed herein may be IEEE 802.11 wireless channels.

On social channels 120a, 120b, 120n, respective periodic synchronization frames 110a, 110b, 110n are broadcast on a periodic basis by a responsible sync station. Each of the PSFs broadcast by a single synchronization station on a single channel (e.g., frames 110a) may be identical or may differ somewhat, such as in the schedule of availability windows that they convey.

Although the PSF period of each channel ($P_A$, $P_B$, $P_N$) is different in FIG. 1, in some embodiments in which multiple social channels are employed, the PSF periods of two or more channels may be identical. An illustrative period between PSFs on one channel may be on the order of 100 milliseconds. Different sync stations may use the same or different PSF periods. In some implementations, the length or duration of a PSF period may be inversely proportional to the overall number of sync stations broadcasting PSFs (or the number of sync stations in a particular region that are broadcasting).

In some embodiments, PSF periods will be different on each social channel; however, the availability window periods implemented by the synchronization stations issuing the PSFs may be the same. Therefore, within one hierarchy, multiple PSF periods and a single availability window period may be implemented.

When transmitting a PSF, the issuing synchronization station or master merely needs to tune its radio to the correct channel and power it on long enough to send the PSF. It need not remain on that channel after issuing the PSF, but rather can turn off its radio to conserve power, switch it to a different social channel (e.g., to prepare to transmit a PSF on a different channel) or use it for some other purpose, such as attending an availability window (as described below), handling infrastructure communication, exchanging data with another device, etc.

Although PSFs are primarily described herein as being issued by synchronization stations, peer devices that are not sync stations may also issue PSFs. They will typically do so with longer periods than a synchronization station, and may include only a subset of the information elements that are carried by PSF 110x of FIG. 1.

PSF 110x is an illustrative periodic synchronization frame broadcast by a synchronization station in some embodiments. In other embodiments, a PSF may contain a subset or a superset of the illustrated elements.

In the illustrated embodiment, the combination of channel 130, time 132 and period 134 may be collectively referred to as "synchronization parameters" or "availability window parameters" because they allow a listening device to learn of a sequence of availability windows that has been imposed by the synchronization station that issued the PSF (or by a superior synchronization station). Channel 130 identifies the channel (e.g., an 802.11 wireless channel) on which the next availability window will occur, time 132 identifies when the window will occur, and period 134 identifies the availability window period, which will allow the listening device to calculate successive availability window starting times.

Multiple sets of synchronization parameters may be included in a PSF, either to advertise sequences of availability windows on different channels, to advise other devices of a change from one sequence to another, or for some other reason.

Time element 132 of the synchronization parameters of PSF 110x may identify an absolute starting time (e.g., based on a synchronized clock, UTC (Coordinated Universal Time) or some other common reference) and/or a relative time. In some implementations, the timestamp field carries the TSF (Time Sync Function) of the station that issued PSF 110x.

In some embodiments, time 132 includes multiple values that a peer device uses to compute the starting time of the next availability window. For example, time 132 may include a "target" timestamp configured to indicate when PSF 110x was formed and queued for transmission within the issuing sync station (e.g., when the PSF was placed into a transmit buffer), and an "actual" timestamp configured to indicate when the PSF was actually dispatched via the station's antenna.

Illustratively, the PSF may be considered formed as of the time a "master offset" parameter is calculated by the sync station. The master offset value, also included within PSF 110x as part of time 132 or a different information element, represents the issuing sync station's internal offset to the start of the next availability window, measured from the time it releases the PSF. Thus, the master offset measures the period of time from the target timestamp to the start of the availability window, as calculated by the station that issued the synchronization frame.

With these values, a peer device that consumes PSF 110x can compute an offset to the starting time of the availability window as follows:

Offset=Master offset−(actual timestamp−target timestamp)

In particular, the peer device receives the master offset and, from the target and actual timestamps, can measure how much of that master offset time period has elapsed; it then subtracts that elapsed period from the master offset to determine the amount of time remaining until the availability window.

Period 134 identifies the period of availability windows conducted by the issuing sync station. The entire logical hierarchy of peer devices may apply the same period and, in fact, the same schedule of availability windows.

Duration 136 of PSF 110x is optional, but when provided indicates the minimum amount of time, during the availability window, that the station that issued PSF 110x will be listening and available for communication. The duration may also apply to the synchronized devices; that is, a device that attends the window may be required to be available for at least that period of time, measured from the commencement of the window.

In some embodiments, a synchronization station may automatically extend its availability window (e.g., in increments matching duration 136 or some other time duration) as long as at least one station is communicating with it. Thus, even if multiple stations wish to communicate with the master device, because the window will be extended, they may be able to do so without waiting for another availability window.

Similarly, a device that attends the availability window may extend its window as long as at least one of its peers engages it in communication. Therefore, one peer that wishes to communicate with another peer may simply issue a first set of packets, datagrams, messages or other units of communication to that other peer during an availability window. Both peers will then automatically extend their windows because of the active communication. Advantageously, this allows extensive peer-to-peer communication during availability window extensions without saturating or monopolizing bandwidth during the availability window.

Thus, a maximum duration of a sync station's presence during an availability window may be specified in PSF 110x and/or may be announced during the availability window. Illustratively, the sync station may need to depart the window in order to issue a PSF on a different channel, to use its radio for another communication function, or for some other reason. As for individual devices, they may depart an availability window if they have nothing to communicate and if no other device communicates with it during some period of time within the window.

In other embodiments, the availability window parameters of a periodic synchronization frame may explicitly identify one or more availability windows instead of identifying just one and supplying a period. These embodiments may be implemented in environments in which a synchronization station and/or other peer devices cannot commit to a regular, periodic schedule of availability windows. In yet other embodiments, a periodic schedule may be applied, but one or more availability windows may be explicitly added to the schedule, or one or more occurrences of a periodic window may be cancelled.

Thus, synchronization parameters or data of a PSF may identify any number of availability windows (zero or more). Different PSFs transmitted on the same or different social channels, and by different masters, may identify the same or different availability windows. In some embodiments, however, synchronization parameters set by the root sync station (including the schedule or sequence of availability windows) are applied throughout the hierarchy. Thus, in these embodiments, all PSFs broadcast throughout the hierarchy report the same periodic schedule of availability windows.

In some embodiments, availability windows are numbered and conducted as a repeating sequence. For example, the n availability windows conducted in one sequence may be numbered 0 through n−1. After one iteration, the availability window sequence numbers repeat (i.e., from 0 through n−1). The sequence number of the next availability window occurring after PSF 110x may be explicitly identified in the frame, may be determined during the availability window, or may be learned in some other way.

PSF 110x of FIG. 1 also reports one or more preference values (alternatively termed a master preference value or a selection value). A preference value is a value (e.g., an integer) used to identify the suitability or preference of a device to be a synchronization station (aka master). A device's preference value is calculated using various metrics, attributes or characteristics of the corresponding device, and possibly characteristics of the communication environment or the device's hierarchy. Illustrative metrics for calculating a device's preference value include available power resources (e.g., battery strength, connection to an AC power source), processor load, signal strength, the device's name and/or address (e.g., MAC address), name or address of the device's default root synchronization station, a timestamp, the device's level or stratum within the default hierarchy (or number of hops from the root), the periodicity of the station's PSFs, a social channel used by the station, and so on.

Preference values of synchronized devices may be compared as part of a selection process to determine which devices should be synchronization stations within a hierarchy. The process may be executed on a regular basis, such as during or after every sequence of availability windows, on a fixed schedule, etc.

In PSF 110x, branch sync station preference value 140 is the master preference value of the branch sync station that broadcast PSF 110x, and indicates that station's suitability or preference to be a synchronization station within its default hierarchy. By advertising its preference value, all devices in range of that station can correctly apply the selection process and, for example, determine whether they are better suited to be a synchronization station.

Similarly, root sync station preference value 142 is the master preference value of the root sync station for the default hierarchy in which PSF 110x was broadcast, and indicates that station's suitability or preference to be a synchronization station. As will be seen below, by propagating root sync preference value 142 throughout the hierarchy, a device at the fringe of the communication environment or in an area overlapping multiple separate hierarchies can determine which hierarchy to join. In addition, all devices in the synchronized hierarchy can determine whether they are better suited to be the root sync station.

When PSF 110x is issued by the root sync station of a default hierarchy, preference values 140, 142 will match. Alternatively, one of the preference value fields could be omitted.

A PSF issued by a synchronization station operating within a group hierarchy may contain additional information elements for conveying preference values pertinent to the group. For example, master selection processes may be executed separately for default and group hierarchies, to select or identify devices to act as synchronization stations for each. Thus, additional preference value(s) that relate to the issuing station's group may be conveyed via a PSF. In some implementations, one or more of the metrics used to compute a preference value may be sent in a PSF in addition to or instead of the preference value itself.

Synchronization identifier(s) 150 include identifiers assigned to the default and/or group hierarchies of the station that issued PSF 110x. As described previously, a default identifier may be used to identify the overall hierarchy that encompasses all peer devices in a region. A group identifier may identify a private group of devices. Other synchronization identifiers may be used for other purposes.

In some embodiments, the default identifier for all devices within a hierarchy will normally be 0 or some other selected value, and only a synchronization device wishing to maintain alignment with an access point or other infrastructure device will use a default identifier having a value other than 0. In this case, the sync station may derive its default identifier from the access point's BSSID (Base Service Set Identifier) using a predetermined algorithm, for example. A synchronization station in this situation may only be able to synchronize with peers that also maintain alignment with the same access point.

A group identifier, however, may be set by a group root sync station, by another group member, at random or in some other manner. A group identifier of 0 (or some other selected value) may be used by a device to indicate that it is not a member of any group. Thus, an idle peer device may have a default and group identifier pair of 0/0, indicating that while it is synchronized with a default hierarchy, it is not participating in any group. A peer device that is active within a private group may normally have default/group identifier pair of 0/x, wherein x is the number used by the device's group. A group may have any number of members. U.S. patent application Ser. No. 13/736,725, entitled "Group Formation within a Synchronized Hierarchy of Peer-to-Peer Devices" and filed Jan. 8, 2013 describes formation and operation of groups within a synchronized peer-to-peer environment, and is incorporated herein by reference.

In some implementations, a PSF may include information elements other than those depicted in PSF 110x of FIG. 1. For example, a PSF may identify an algorithm for selecting synchronization stations or masters, specify constraints on sync stations (e.g., how many can be within range of each other), advertise a maximum depth for the device's hierarchy, provide a notification that a station is departing the network, etc.

Also, when a synchronization station that is a member of a group issues PSFs, those frames may include information elements specific to the group, in addition to or instead of group-specific preference values mentioned above. For example, a PSF issued by the station may include a group-specific set of elements that include some or all of: the station's preference value, its level or stratum in the group (or number of hops from the group root sync station), name or address of the group root sync station, group identifier, and/or any other data relating to the group hierarchy and/or a default hierarchy to which the station belongs.

Although a synchronization station may have a stated period to the issuance of periodic synchronization frames, that period is flexible and there may be high tolerance for variation. A given PSF may be advanced or delayed in time because of other demands on the station's radio, because of contention on the communication channel or for some other reason. In some implementations, PSFs may vary on the order of +/−20 milliseconds every 100 milliseconds.

Periodic synchronization frames may be transmitted opportunistically, meaning that if a synchronization station's radio is tuned to a different channel at the time it would ordinarily issue a PSF on a social channel, it may instead issue the PSF on its current channel. PSF broadcasts will return to their normal schedule on the social channel(s) when able.

This type of situation, in which a PSF is sent on a non-social channel to identify a future availability window, can be very useful to a localized cluster of devices. Such devices likely will be associated with the same infrastructure network on the same (non-social) channel. Transmitting a PSF on this channel saves these devices the cost of a channel switch (i.e., to the social channel) and avoids interfering with their infrastructure communications.

In the worst case, a new device tuned to a sync station's normal social channel may miss a limited number of PSFs if the sync station is busy on a different channel. However, the sync station may be tuned to a commonly used frequency (e.g., an infrastructure channel required for a particular application, as described above), and may therefore reach the same device at a different time.

Among other information that may be included in a PSF is the issuing station's period for sending periodic synchronization frames, and the channel or channels the PSFs will be broadcast on. This allows a peer device to determine the maximum amount of time it must listen on a particular social channel in order to hear a PSF and learn the availability window schedule.

Availability windows scheduled by a synchronization station may or may not occur at a regular period, and may or may not be synchronized with the station's PSFs. In other words, the availability windows need not occur at identical offsets from the PSFs. An illustrative duration of time that a full sequence of availability windows occupies may be on the order of multiple seconds, although a specific implementation of an embodiment may employ a shorter or longer duration.

In some embodiments, there is less tolerance regarding an availability window period than there is regarding a periodic synchronization frame period, perhaps on the order of +/−100 microseconds per second for availability windows (compared to +/−200 milliseconds per second for PSFs). Whereas PSFs are very short (e.g., less than 1 millisecond) but issued frequently, availability windows are relatively long (e.g., longer than 50 milliseconds) and conducted infrequently (e.g., approximately one per second). PSFs may be scheduled opportunistically because of their short duration, but availability windows are configured for device discovery and communication, and therefore generally may not be conducted spontaneously or opportunistically.

Although infrequent, availability windows may monopolize a radio interface for a significant period of time; because of this, adherence to a strict schedule is advantageous, especially if other radio technologies are present (e.g., Bluetooth). Also, other (synchronized) devices are depending upon the advertised schedule of windows for discovery and/or peer communication, which leaves less room for variation.

Therefore, in some embodiments, a PSF transmission period will have a relatively high tolerance for variation, while an availability window period has a relatively low tolerance for variation. One advantage of this strategy is that it makes allowance for Wi-Fi contention that occurs at every periodic synchronization frame transmission. PSF transmission is only possible when the selected social channel is not in use, and contention for the channel or the radio may or may not delay issuance of the PSF. Therefore, strict scheduling of all PSF transmissions would be difficult to achieve.

When a peer device first synchronizes with a master device and begins attending availability windows, in the first window (and/or the first window that all devices are required to attend) it may issue a message identifying itself, identifying its preference value, providing its selection metrics, advertising its services, etc. Any devices wishing to communicate with it can then make contact.

Although availability windows are provided as a primary mechanism for peer devices to discover each other and services that are offered, a device (including a sync station) may skip one or more windows in a sequence. For example, if a peer device needs to use its radio for some other purpose during an availability window, it may not attend that window at all, may arrive late or may leave early. The device may or may not advise a sync station or other devices of its absence (e.g., via a multicast message).

In some embodiments, a device may set a "presence mode" for itself, and advertise this value to its synchronization station(s) and/or other peers, to indicate how frequently it will tune into or attend advertised availability windows. In some implementations, a presence mode (or PM) is an integer value such as 1, 2, 4, etc. The reciprocal of the device's PM is a fraction indicating how many availability windows in a sequence it will attend. For example, if a device's PM=1, the device will attend every availability window; if its PM=2, the device will attend every window having a sequence number that is a multiple of 2 (i.e., ½ of the windows); if PM=4, it will attend every window whose sequence number is a multiple of 4 (i.e., ¼ of the windows).

Higher presence mode values allow a device to skip more windows and turn off its radio, thereby saving power. Ultimately, a presence mode equal to the number of availability windows in a sequence (i.e., n in FIG. 2) means that a device will attend only one availability window per sequence. A PM value of zero may indicate that a device is always available (i.e., not just during availability windows).

In some embodiments, every synchronized device must attend at least one availability window in the sequence advertised by its master. For example, devices may be required to attend availability window 0 of each sequence. Thus, in this case, a PM value equal to the length of the availability window sequence indicates that the device will only be present during availability windows having sequence number 0.

The length of an availability window sequence is generally a power of 2 (e.g., 8, 32, 256). In some implementations, sequence numbers of availability windows conducted by a synchronization station begin at zero, and increase one at a time until reaching the value length-1 (e.g., 7, 31, 255), after which they repeat. Branch synchronization stations are required to adopt and repeat (in its synchronization frames) the current sequence number of its master (i.e., a higher-level branch sync station, or the root sync station). Therefore, all devices synchronized under one root synchronization station (i.e., all peer devices within one default hierarchy) will agree on which availability window has sequence number 0.

In some embodiments, sequences of availability windows advertised by different synchronization stations may be of different lengths. However, all sequences will be aligned so that all devices having a particular presence mode value will attend the same windows. In other words, all devices will agree on which particular windows are multiples of a given number.

For example, consider a hierarchy in which availability window sequences of lengths 8, 16 and 64 are in use among different sets of devices (e.g., devices synchronized with different branch sync stations). Among the devices implementing the sequence of eight windows, every eighth window will be known as availability window sequence number 0. Every availability window having sequence number 0 for those devices will be an availability window having sequence number 0 or 8 for those devices having a sequence that is 16 windows long, and as an availability window having sequence number 0, 8, 16, 24, 32, 40, 48 or 56 for those devices with 64 availability windows in their sequence.

A device may attend more availability windows than its PM indicates, but by announcing its presence mode value (e.g., via a multicast message in availability window sequence number 0), other devices will know when they can interact with it. And, as described previously, as long as one other station sends a communication to a device during a window attended by the receiving device, that device will extend its presence on that channel in order to conduct the communication, if possible, and will be able to be contacted by yet other stations as well.

Further, in some embodiments, whenever a peer device having a presence mode greater than one (or some other threshold) receives a communication, it may automatically set its presence mode to one (or some other lower value) in order to facilitate the desired communication. Yet further, a device with a low presence mode (e.g., zero or one), after receiving a multicast frame in one availability window, may repeat it in one or more subsequent windows to help get it to its peers.

A synchronization station may have any PM value; although it sends synchronization frames at periodic intervals (possibly even during an availability window), it may shut off its radio or use its radio or antenna for other communications requirements during an availability window when it is not sending a synchronization frame.

In some embodiments, two or more peer devices wishing to conduct a relatively extended period of communication (e.g., for file transfer, to engage in a game or other application) may establish their own synchronization for the purpose of exchanging data, parallel to the overall synchronization, but outside of or in addition to scheduled availability windows and without forming a private group. In these embodiments, one of the two or more devices may assume the role of a non-selection master, meaning that it does not participate in a master selection process as described in a following section, but is available for other devices to synchronize to or with (e.g., to conduct a file transfer, to play a game). Devices synchronized with a non-selection master may form a basic service set (BSS).

A non-selection master may issue synchronization frames that the other peer devices with which it will communicate will use to synchronize with the non-selection master, but which other devices in the community will ignore. Illustratively, these synchronization frames may be transmitted during an availability window or on an agreed-upon channel. A non-selection master's synchronization frames may specify that the device is a non-selection master, so that devices not needing to directly communicate with it will know that they should not synchronize with it. When a device that has been engaged in communication with a non-selection master terminates that communication, it may re-synchronize with a regular master or synchronization station and rejoin a default hierarchy (e.g., if synchronization with the non-selection master did not leave it synchronized with the hierarchy).

A device that wants to synchronize or maintain synchronization with a community of peers may be unable to do so, perhaps because it cannot monitor the community's social channel(s), has other commitments during the scheduled availability windows, or for some other reason. In this situation, the device may become a non-selection master (and identify when it is available) to help other devices discover it. Alternatively, it may request a sync station to alter its synchronization schedule to accommodate the device (e.g., change the channel(s) and/or times of the sync station's availability windows), or may become a sync station if its selection preference value indicates that it should. As a synchronization station, especially as the root sync station, it could change the availability window schedule.

In some embodiments, during an availability window on a rendezvous channel a synchronization station or other device (e.g., a non-selection master) may broadcast a different type of synchronization frame called a master indication frame (MIF). In these embodiments, master indication frames provide information that helps peer devices achieve or maintain synchronization—either with a sync station that issues regular PSFs or with a non-selection master that devices may synchronize with to exchange data directly, for example. A master indication frame may be sent during an availability window, but generally will not be sent on a social channel unless, for example, one is sent during an availability window that is occurring on a social channel.

A master indication frame may include any data that a periodic synchronization frame might include, and/or other information. For example, an MIF might be sent by a sync station to report that it will start using a different social channel for sending PSFs, might be sent by a non-selection master to report that it will have a window of availability on a particular channel at a particular time, might be sent by another device to report synchronization data it heard from some other sync station or to advertise its availability, etc.

When an availability window overlaps with the time a PSF would normally be sent (i.e., according to the issuing sync station's PSF period), the regular PSF may be sent on the channel on which the availability window is conducted (and not on the social channel). During availability windows that do not overlap with the expiration of a master's PSF period, the master may nonetheless send an MIF to ensure that devices synchronized with it have the necessary synchronization data without having to tune into a social channel for a regular PSF. However, a device may still periodically listen on one or more social channels to learn of other masters.

Because peer devices having presence mode values greater than one may not attend every availability window, but may be required to be present during availability windows having sequence number 0, a synchronization station may by default always broadcast a PSF or MIF during those windows. Whereas PSFs are short but frequent, MIFs are longer and less frequent, and may pack extended service and device capability payloads.

It may be noted that periodic synchronization frames are sent frequently, usually outside of availability windows, in order to help non-synchronized devices synchronize with their peers. After a collection of devices is synchronized, those devices may only (or primarily) meet during relatively sparse availability windows, especially those devices that have adjusted their presence modes to use their radios less and thereby save power. To remain synchronized, these devices may rely on master indication frames sent during availability windows.

In some embodiments, devices are required to implement guard periods at the beginning of some (or all) availability windows, during which they listen and can receive communications, but do not transmit. In different embodiments, this restriction may or may not always apply to sync stations that issue regular PSFs, but generally will always apply to non-selection masters.

Figure 2:
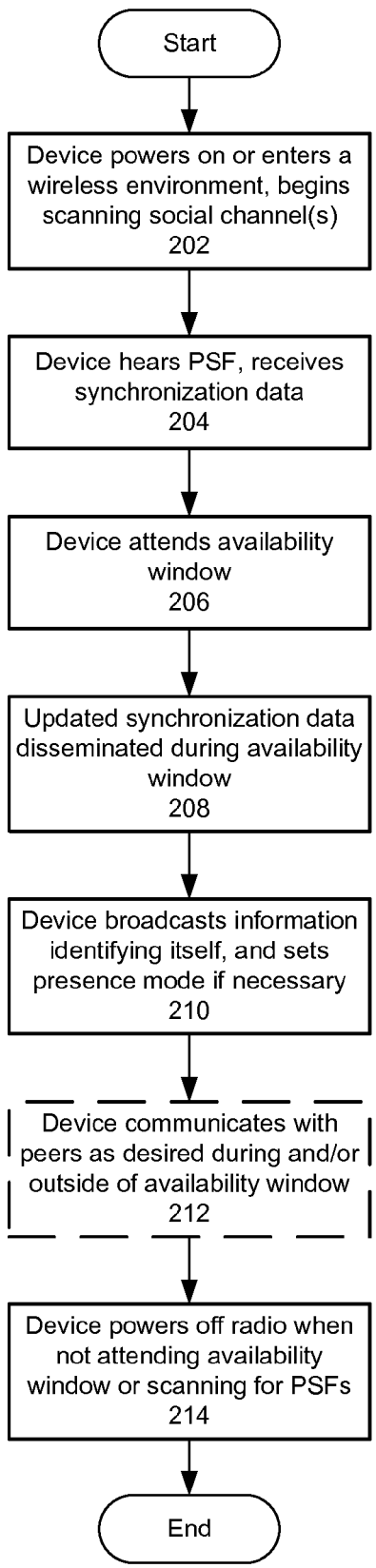
FIG. 2 is a flow chart demonstrating synchronization of a device with a community of peers in a wireless communication environment, according to some embodiments.

FIG. 2 is a flowchart demonstrating synchronization of a device with a community of peers in a wireless communication environment, according to some embodiments.

In operation 202, the device powers on or enters the environment and begins listening on one or more predetermined social channels for a periodic synchronization frame (PSF). It may be programmed with information regarding the default or possible periodicity of PSFs, and may therefore only need to listen on a given social channel for a limited number of those periods (e.g., one, two) in order to intercept a PSF broadcast by a synchronization station on that channel.

In operation 204, the device hears one or more PSFs and extracts the offered synchronization data. In the illustrated embodiment, all PSFs issued by synchronization stations within the same device hierarchy will advertise the same availability window sequence or schedule. The sync stations may transmit their PSFs on the same or different social channels, and may conduct the availability windows on the same non-social channels.

If the device did not hear any periodic synchronization frame, it may assume that there is no synchronization station within range. Therefore, it may take on the role of root sync station and begin issuing its own PSFs in order to synchronize other devices in range. A process for selecting sync stations may be regularly or even continually applied to identify the devices that should be masters.

In operation 206, the device tunes its radio to the specified channel and attends the next availability window, assuming that its radio is not preempted by another application or service. If it cannot attend, the device will attend the next availability window that it can, although it may need to listen on a social channel again to receive the next set of synchronization data and learn its channel and starting time. The device may postpone attending an availability window until the start of the next sequence of windows, and therefore tune into the next required window (usually a window having sequence number 0).

In operation 208, during an availability window, a synchronization frame is broadcast by the synchronization station with which the device is now synchronized (e.g., a PSF or an MIF). This may relieve the device of the need to scan one or more social channels. The synchronization frame illustratively may be transmitted during an initial guard period or quiet period at the beginning of the availability window, during which devices that are not sync stations (e.g., leaf devices) may not transmit.

In operation 210, the device sets its presence mode if necessary or desired (e.g., if the device cannot attend the full sequence of availability windows). During at least the first availability window that it attends, and/or the first availability window having sequence number 0, the device identifies itself (e.g., address, name, service information) in a message broadcast to all synchronized devices. It may advertise its presence mode at the same time.

In optional operation 212, the device may communicate directly with one or more of its synchronized peers during the availability window and/or out-of-band, or they may communicate with the device. As discussed above, the device may extend its attendance at the window one or more times in order to facilitate the communications, will advertise to its active peers if and when it must leave the window (e.g., to use its radio for some other purpose), and may arrange a separate rendezvous (on the same or a different channel) with one or more peers.

In some embodiments, traffic reduction or limitation measures may be implemented during some or all availability windows in order to reduce communication congestion and collisions. Illustratively, the synchronization station that controls the availability window sequence may specify when a measure is in place. In some implementations, traffic reduction measures are only applied during availability windows, and not during availability window extensions. In mandatory availability windows (i.e., availability windows having sequence number 0), traffic reduction measures may be mandatory.

By way of example, a traffic reduction measure may serve to limit a device regarding the number of multicast frames it may transmit during one availability window (e.g., approximately three). Transmission of unicast frames may also be limited.

For example, unicast transmissions may only be permitted to (and/or from) devices having unknown presence mode values or values greater than one (or some other threshold). Limitations on unicast or multicast frame transmission may not apply to devices synchronizing among themselves (e.g., with a non-selection master) for a limited purpose, such as file transfer.

In operation 214, the device may power off its radio when not needed to listen for PSFs on a social channel or to attend an availability window.

The method depicted in FIG. 2 is merely illustrative, and does not limit methods according to other embodiments.

As described above, two or more peers may engage in their own synchronization, outside of or in addition to any availability window. For example, one of them may assume the role of a non-selection master and issue master indication frames or other synchronization frames during an availability window, to advise its peers as to when and where (i.e., time and channel) they may synchronize with it. As another option, the peers may form a private group.

However, one peer may desire a short communication exchange with another peer without synchronizing. For example, a device synchronized with one hierarchy may wish to discover services offered by a peer (or peers) synchronized within a different (e.g., neighboring) hierarchy, may wish to poll a neighboring peer, etc. At least initially, they do not intend to engage in a significant exchange of data (e.g., as with a file transfer). Some embodiments provide this ability in the form of out-of-band inquiries and responses.

More specifically, a first peer may hear a synchronization frame of a neighboring hierarchy and thereby learn its schedule of availability windows. If able, it may attend one or more of the neighboring hierarchy's availability windows and thereby discover other devices, and it may send out-of-band frames to one or more of the neighboring devices.

Figure 3:
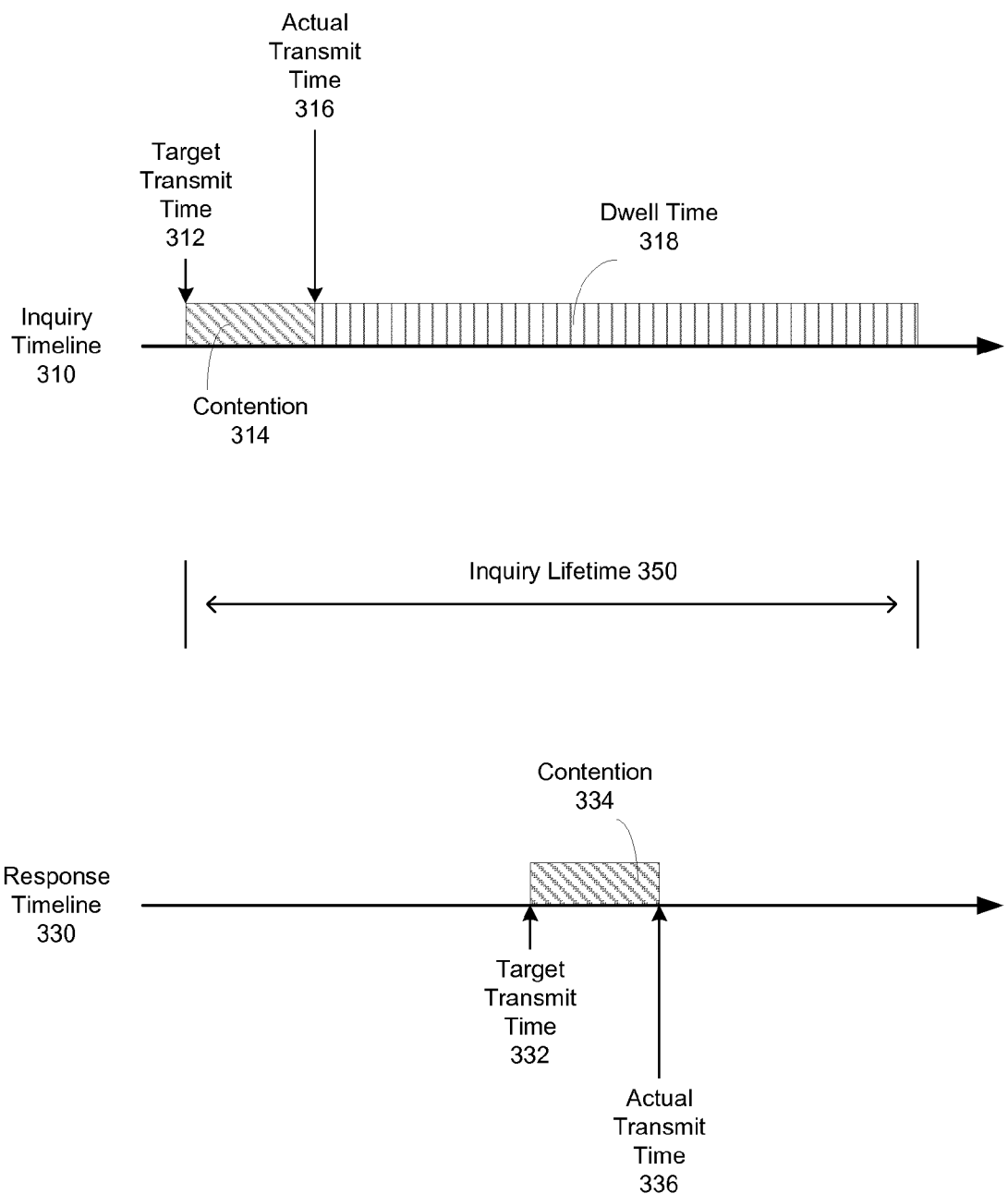
FIG. 3 is a diagram demonstrating an out-of-band exchange according to some embodiments.

FIG. 3 is a diagram demonstrating an out-of-band exchange according to some embodiments. As with the timing of periodic synchronization frames described above, the transmitting device must consider delay that will occur within itself, between the time it releases or prepares the inquiry for transmission and the time it is actually transmitted.

Inquiry timeline 310 reflects activity at the inquiring device, while response timeline 330 reflects activity at the responding device. When issuing the inquiry, the inquiring device must choose a suitable inquiry lifetime 350, such that the responding device will have time to receive, process and react to the inquiry.

In the illustrative inquiry and response, the inquiry is queued for transmission from the device at target transmission time 312. Because of contention for the antenna or the medium, and/or other delay (collectively represented as contention 314 in FIG. 3), the inquiry is not physically transmitted until actual transmit time 316.

Dwell time 318 is the remainder of the inquiry lifetime, during which the responding device must receive the inquiry and generate and transmit its response. The duration of dwell time 318 depends on the inquiry lifetime set by the inquiring device and the duration of contention 314. The responding device may also experience delay between its target transmit time 332 and the actual transmit time 336 of the response; this delay is represented as contention 334.

The inquiry may identify (in the out-of-band inquiry) any or all of the relevant time parameters (e.g., inquiry lifetime, target transmit time, actual transmit time, contention), so that the responding device can determine whether it will be able to respond before the inquiry expires. If not, it may drop the inquiry or abort its response. If the inquiring device does not receive a response during the inquiry lifetime, it may retry (e.g., with a longer lifetime), abandon the inquiry or take other action.

In some embodiments, a peer device may issue out-of-band inquiries to a sync station that it can hear, but which it is not synchronized to, in order to identify services offered by that sync station and devices synchronized to that station. In some implementations, it may relay information regarding other sync stations to its synchronized peers, such as during one or more of their availability windows. Information about another sync station (or other peer device) that may be revealed may include things such as a social channel it monitors, its availability windows (e.g., time, channel, period), master offset, services it offers, address, etc. An out-of-band inquiry may thus function as a quasi-PSF or quasi-MIF, in that it can allow a device to synchronize to the hierarchy of the sender of the inquiry.

Some unsynchronized masters (e.g., sync stations to which no leaf devices or subordinate masters have synchronized) may adopt a low-power mode of operation. This low-power mode of operation may be indicated in the station's synchronization frames, or may be inferred by the sequence or schedule of availability windows and/or the presence mode advertised in the synchronization frames.

In one such mode of operation, an unsynchronized master may still send periodic synchronization frames, but provide short availability windows having long periods (e.g., multiple seconds). Because of the short, sparse nature of the availability windows, it may take some time for a peer to discover services offered by the unsynchronized master.

During synchronization of peers within a communication environment according to some embodiments, as peer devices are organized into a hierarchy, leaf (or slave) devices synchronize with branch sync stations within range; those stations (and possibly other leaf devices) synchronize with higher branch sync stations, and so on, with one root sync station providing synchronization information for the entire environment. A leaf device may synchronize directly with the root sync station if it is in range.

An operating parameter of devices within an environment may specify the maximum depth of the devices' hierarchy, which may be defined as the number of levels or strata of synchronization stations. The root sync station's position is defined as stratum zero, and branch sync stations will reside in strata numbered 1 through D, wherein D is the maximum stratum at which a synchronization station may reside.

By default, while the hierarchy is being organized, a peer device may issue periodic synchronization frames until it falls into position as a leaf, at which time it stops transmitting PSFs. A device may choose to be a leaf, even if the applicable selection algorithm could otherwise make it a sync station, unless there is no synchronization station in range of the device. If there is no sync station in range, the device must take on that role.

All masters continue to issue PSFs to maintain synchronization within their areas, and may do so with a periodicity that is a function of its level, or stratum, within the hierarchy. For example, the root sync station at stratum 0 may issue PSFs on the order of every 100 milliseconds (ms), a branch sync station at stratum 1 may issue PSFs on the order of every 150 ms, a branch sync station at stratum 2 may issue PSFs every 500 ms, and so on. These values are merely exemplary and in no way limit or restrict the duration of PSF periods; synchronization stations within different strata may employ the same period, and sync stations in the same stratum may employ different periods.

A master's stratum will usually be reported within its PSFs. This information allows a listening device to determine how deep the hierarchy is within its area of the environment. Depending on that depth and/or other information (e.g., how many sync stations it can hear issuing PSFs, the maximum hierarchy depth), the device may be able to determine that it should be a leaf or that it should continue issuing PSFs and remain a synchronization station.

A hierarchy's maximum depth parameter may be programmed into devices and/or advertised within periodic synchronization frames. Other restrictions may also be imposed, such as a maximum number of sync stations, a requirement that a sync station only continues in its role as long as it can hear no more than a threshold number of other masters (e.g., within a particular range, at a particular stratum, overall), etc.

For example, where the hierarchy's maximum depth is D, a sync station situated at stratum $S \geq 1$ (i.e., all strata except the root) may only be allowed to hear D−S other sync stations operating in stratum S and still continue to serve as a sync station (assuming those other masters have higher or better selection preference values). This provision may allow for concentration of higher level branch sync stations near the root synchronization station, and dispersion of branch sync stations further away.

In some embodiments, a selection algorithm or process may prefer to retain an incumbent sync station over another device that would otherwise be given preference, unless the other device's selection preference value exceeds the incumbent's by a threshold. This may help avoid thrashing or excessive switching of sync stations. However, because a sync station's principal task is simply to broadcast synchronization data, switching sync stations does not impose a high transaction cost on the hierarchy or an individual device.

In some embodiments, a device will synchronize with the best sync station that it can hear (i.e., the sync station having the highest preference value), or the best sync station that it can hear within a given range (e.g., with a signal strength above a particular threshold).

When a device comes online in an environment and listens for PSFs, if it only hears from a branch sync station at the deepest or maximum stratum of the hierarchy, it may synchronize to that station as a leaf. If, however, the device can also hear another sync station in a different hierarchy (e.g., as determined by the root sync station attributes advertised in a periodic synchronization frame), it may favor joining that hierarchy if that other sync station is not at the maximum depth or stratum or if that other sync station has a better selection preference value.

A device that can only hear other devices relatively deep in the hierarchy (e.g., high strata values), may be able to determine that it is at the fringe of the environment. If most or all of the other devices are already at the maximum depth, a new hierarchy may spawn, especially if a device with a high preference value appears.

A new environment/hierarchy may also spawn when an existing one spans too large a spatial area. For example, a combination of the depth of the hierarchy, a measure of how close peer devices are and/or other factors, may cause a new hierarchy to be spawned. Signal strengths detected between peers may be one way of determining the proximity of peers.

Requiring peers to synchronize only with masters relatively close to them may cause the hierarchy to be relatively compact. In contrast, a high limit on the maximum depth of the tree may allow the hierarchy to cover more area. By adjusting these (and/or other parameters), a suitable hierarchy may be formed.

Different parameters for configuring a hierarchy will be suited to different environments, depending on the density of devices, the communication load and/or other factors. For example, if the load is relatively light (e.g., the devices are low-power sensors), drawbacks associated with a hidden node problem should be limited and a relatively deep hierarchy may be implemented (e.g., on the order of ten to fifteen levels). Also, in sparser environments, a process for selecting sync stations may resolve faster.

The hidden node problem refers to a scenario in which multiple devices that are not in range of each other try to communicate with a common peer. Because they cannot hear each other's transmissions they cannot avoid them, and their communications to the common peer may collide. Although this may be exacerbated by the need to communicate during a relatively short period of time (i.e., within an availability window), a light load may help mitigate the problem and allow a deeper hierarchy than would be possible in a dense environment with a heavier load.

Without a method of synchronization described herein, the total number of discovery frames needed to discover all devices in an environment could approach the square of the number of devices (i.e., each device might need to send at least one frame to every other device). These frames would be sent at random times and on any channels.

In contrast, the collective synchronization afforded by some embodiments enables synchronization based on regular transmissions from a select set of devices (i.e., sync stations), and scales well. In a perfectly synchronized environment, the number of frames needed for all devices to discover each other is proportional to the number of devices. One discovery frame broadcast during an availability window having sequence number 0 will reach all other devices in range.

Cooperative Channel Switching

In some embodiments, a peer device plans or adjusts a sequence of channels to which to tune a radio, based on multiple competing demands that include a data transfer or data exchange operation. For example, and as discussed previously, as part of a synchronized peer-to-peer network a device may be required to attend one or more availability windows on a rendezvous channel, and may need to broadcast or receive Periodic Synchronization Frames (PSFs) on one or more social channels. Other device functions may also require use of a shared antenna to maintain a connection with an access point, to scan one or more channels other than the current channel, etc.

Traditional methods of accommodating multiple demands on a shared communication resource usually involve granting the resource to one function after another, in succession. In these methods, for example, a device's peer-to-peer communication session with another device (e.g., for data transfer) might be interrupted to accommodate a Bluetooth requirement to contact another entity, then the peer-to-peer session could resume, only to be interrupted by a requirement to tune to a social channel to capture a PSF, then return to the data transfer operation, then change frequencies to conduct a channel scan, etc.

One problem with these traditional methods of accommodating competing demands for a device's radio is that the throughput of a data transfer operation being conducted by the device will suffer. In particular, each time the radio must be tuned away from a communication partner the data communication must cease for some period of time.

Therefore, in some embodiments, a sequence of channels to which a peer device will tune its radio is designed to promote an ongoing data exchange or other communication even while the device is satisfying one or more competing communication demands. In these embodiments, a device that must share a communication resource (e.g., radio, antenna) among multiple functions or operations while engaged in a data transfer with one or more peers will devise a sequence of frequency changes that will accommodate those demands, advise those peers of the schedule and, during the sequence of changes, continue exchanging data to the extent possible.

Because each frequency change may have a predetermined duration (e.g., 60 ms, 100 ms), and the device may need only a fraction of that time to satisfy the workload that required tuning to a particular channel (e.g., to conduct an active or passive scan, to issue a beacon or other signal, to capture a PSF), for the rest of the time spent tuned to the channel the device may continue transferring data with a peer that is able to accommodate some or all of the frequency changes.

In some embodiments, a pair of peer devices may contrive to exchange data to transfer a file, to play a game, to discover services and/or for other reasons. To support the data exchange, in different implementations the pair of devices may form a private group, one of them may become a non-selection master, in which case the other will synchronize with it, they may engage in out-of-band communications, or some other form of cooperation may be conducted.

For purposes of explaining some embodiments, it will be assumed that the devices are synchronized—either one has synchronized to the other or they have both synchronized with one or more synchronization stations within the same hierarchy. They may be a group, or part of a group, one may be a non-selection master, or they may have implemented some other form of one-to-one synchronization.

Because they are part of one hierarchy, they have a common commitment to maintain synchronization with that hierarchy, which in these example embodiments requires them to tune to specified channels to receive PSFs and/or attend availability windows. For purposes of illustration, they each also have separate requirements to regularly contact different access points or other infrastructure devices.

Figure 4A:
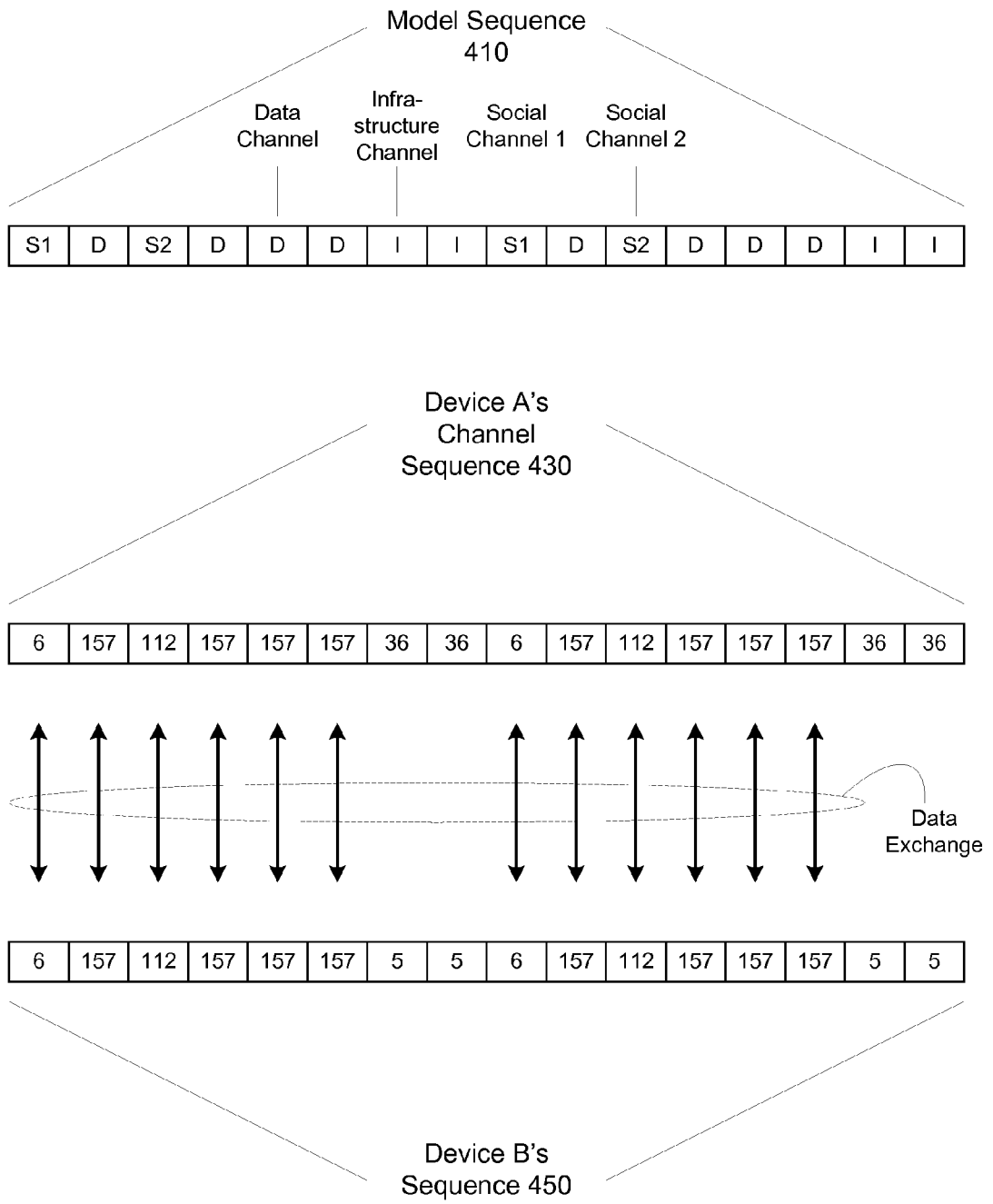
FIGS. 4A-B depict a sequence of channels devices will tune to in order to satisfy conflicting communication demands while conducting a data transfer operation, according to some embodiments.

FIG. 4A illustrates channel sequences for two peer devices engaged in a transfer of data, within a peer-to-peer networking environment described herein, according to some embodiments.

In this illustrative scenario, model sequence 410 is a template showing a sequence of functions to which the device is to dedicate its wireless communication resources in one cycle of operation. In this scenario, an entire cycle lasts 960 ms and is divided into 16 time slots that are each 60 ms long. The functions are abbreviated as follows:

| Function | Device A's Channel | Device B's Channel |
|---|---|---|
| S1: Social Channel 1 | 6 | 6 |
| S2: Social Channel 2 | 112 | 112 |
| D: Data Channel | 157 | 157 |
| I: Infrastructure Channel | 36 | 5 |

Because devices A and B are synchronized within the same hierarchy (or with each other), they use the same social channels "S1" and "S2"—channels 6 and 112. As discussed above, a social channel is a channel on which one or more synchronization stations broadcast periodic synchronization frames. Peer devices will therefore tune to a social channel to receive a synchronization station's PSF. Illustratively, one of the two social channels (e.g., S1) may be in the 2.4 GHz band and the other (e.g., S2) in the 5 GHz band. Devices A and B may be dual-band devices and therefore monitor both channels.

Data channel 'D' is the channel selected for devices A and B to use to conduct their data exchange. The specific channel (e.g., channel 157) may be one of a predetermined list of channels to attempt to use, one of the two devices may have specified or requested the channel, it may be identified in a PSF or it may have been selected or specified in some other manner.

Infrastructure channels "I" are used by devices A and B to maintain contact with an access point or other infrastructure component. As shown in model sequence 410, each device must periodically use its radio to support the infrastructure connection. Because they are assumed to be participating in separate basic service sets (BSS), each has a different infrastructure commitment (i.e., channel 36 for device A and channel 5 for device B).

Channel sequences 430, 450 illustrate the sequence of channel switches implemented by devices A and B, respectively, and are configured according to model sequence 410. It may be noted that the devices have scheduled use of the data channel for the same slots, and will use those slots to conduct their data exchange.

In some embodiments, channel sequences 430, 450 comport with a schedule of availability windows issued by a synchronization station. For example, some or all of the time slots scheduled for data exchange on channel 157 may match scheduled availability windows on that channel. As described in the previous section, a sequence of availability windows may be relatively long (e.g., multiple seconds), and a device need not attend every availability window. Therefore, channel sequences 430, 450 may include one or more time slots that coincide with availability windows.

In some embodiments, each device knows the schedules of its peers, regarding their channel sequences. Therefore, each of devices A, B know that the other device is tuned to the same social channels during the $1^{st}$, $3^{rd}$, $9^{th}$ and $11^{th}$ time slots of a communication cycle. In addition, because each of devices A, B know the other device's presence mode value, they know which availability windows the other device will attend.

In some implementations, during a time slot intended to permit capture of a PSF, the devices may proceed with their data exchange after they have received the periodic synchronization frame, or may conduct their data exchange as usual during these slots, and allow the sync station that is to send the PSF to contend for the channel. In yet other implementations, however, the full time slots may be dedicated to receipt of the PSF and/or attendance at an availability window during the social channel time slots.

In the sequence of communication operations depicted in FIG. 4A, the operations require channel switches, but only with limited competition between communication functions. In particular, each device has a commitment to maintain an infrastructure connection; these connections are on different channels and hence do not permit opportunistic data exchanges. Each device also participates in a peer-to-peer network environment, which requires them to periodically capture PSFs and/or take other action (e.g., attend availability windows). Finally, the devices are engaged in a data exchange operation that directly conflicts with the infrastructure connection requirements, and which may also conflict with the peer-to-peer synchronization requirements; the synchronization requirement may allow for opportunistic data exchange, but the infrastructure requirements may not.

Figure 4B:
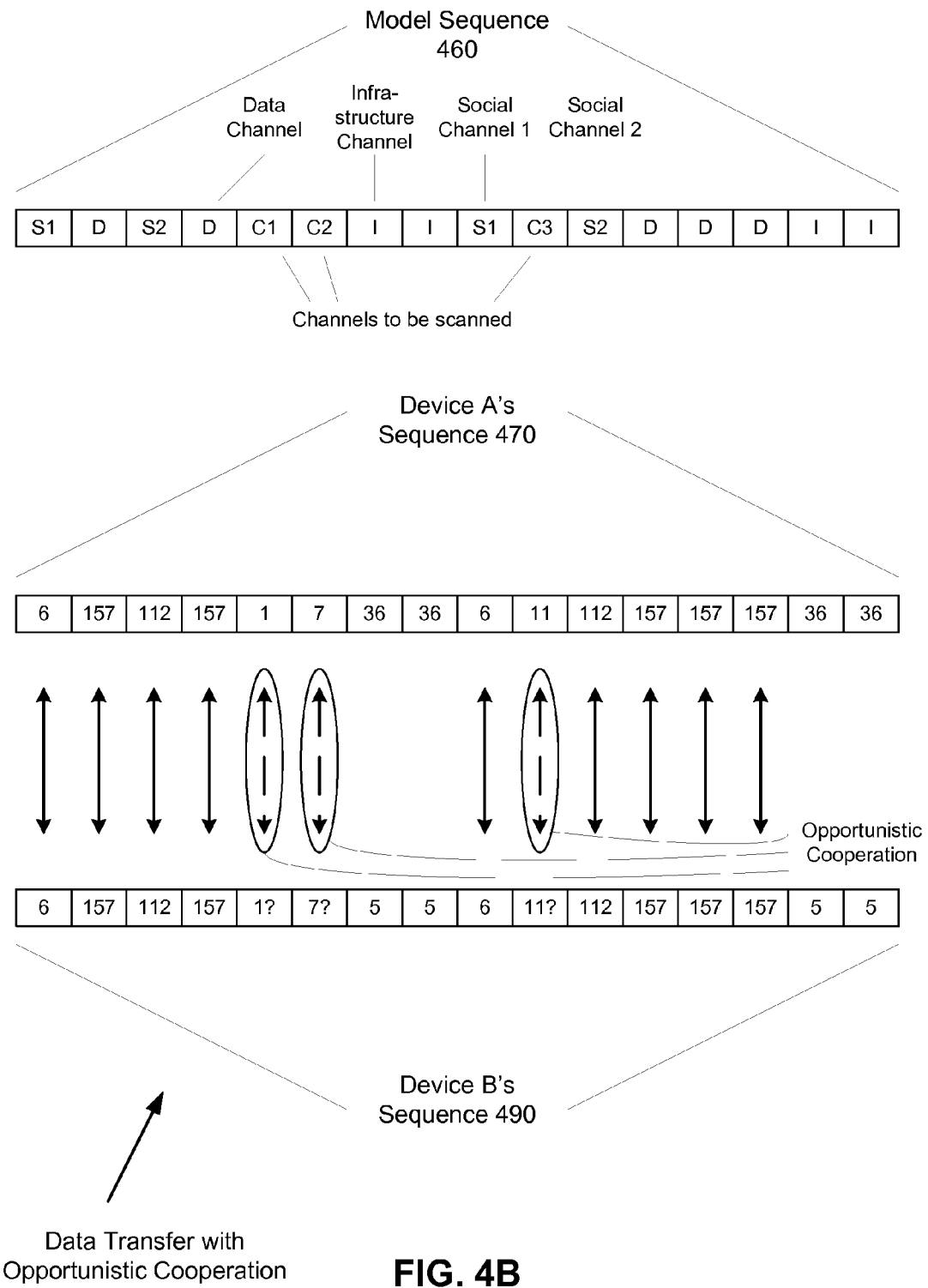

FIG. 4B depicts a further change to device operations, in that device A now has a requirement to conduct scans on multiple different channels —channels 1, 7 and 11. For purposes of illustration, it is assumed that each scan can be completed within one time slot. The manner in which the devices cooperate to opportunistically continue their data exchange while one of them conducts channel scans may also be applied when one or both devices must satisfy a different type of demand for a shared communication resource.

Channel sequences 470, 490 illustrate the sequence of channel switches implemented by devices A and B, respectively, and are configured according to model sequence 460.

In a traditional peer-to-peer communication scheme, the data exchange between devices A, B would be suspended while device A tunes to channels 1, 7 and 11 and conducts the necessary scans. In the illustrated implementation, this would cut the throughput of the data exchange by 25%. Whereas they had been exchanging data during 12 of the 16 time slots of a cycle in FIG. 4A, now 3 of those 12 time slots are used for an incompatible function.

However, according to some embodiments, device A will advise device B of device A's new channel sequence 470, in advance of its implementation. For example, device A may describe sequence 470 (or just describe its delta from sequence 430) and indicate when it will be implemented (e.g., at the start of the next communication cycle). Device A may pass this information to device B in the course of their data exchange, may conduct an out-of-band communication, may announce its new channel sequence during an availability window, etc.

In response to this notification, device B will determine whether it can accommodate some or all of the channel switches. To the extent it can, it will do so and the devices will continue their data exchange during those time slots, on the new channels.

In some embodiments, device A will attempt to minimize the disruption to a data exchange operation that will be caused by satisfying a conflicting demand on a shared communication resource, by satisfying that demand over multiple communication cycles instead of just one cycle as illustrated in FIG. 4B. For example, instead of putting all three channel scans into sequence 470, device A could instead do a scan on one of the three specified channels (i.e., channels 1, 7, 11) during each of three separate communication cycles, which may or may not be successive. This will delay completion of the channel scans, but cause less disruption to the data exchange.

In these embodiments, device A could inform device B ahead of time of all three sequence alterations, or inform device B of one change at a time. In either case, device B may accompany device A in tuning to the target channel at the specified time and continuing their data exchange while device A performs its scan.

Similarly, if device A requires more than one time slot for a scan —such as a passive scan that requires two successive time slots —it will schedule an altered channel sequence and inform device B. To the extent device B can accommodate the change, it will do so and the data exchange will continue.

In some embodiments, devices other than masters/synchronization stations may issue periodic synchronization frames. In these "slave" or "peer" PSFs, a peer device may announce its channel sequence —i.e., the sequence of channels it will tune to. For example, in an illustrative embodiment compatible with FIGS. 4A-B, device A may issue PSFs on one of the social channels, during the data exchange and/or during an availability window. The announced sequence may be of any length.

Further, a PSF (whether by a master or a slave) may include an "invite" field that serves to invite other devices to join the device on the sequence of channels if, for example, they have a need to communicate with the device. The invite field may identify one or more specific peer devices invited to join the issuing peer device, or may be a general invitation to all peer devices.

Figure 5:
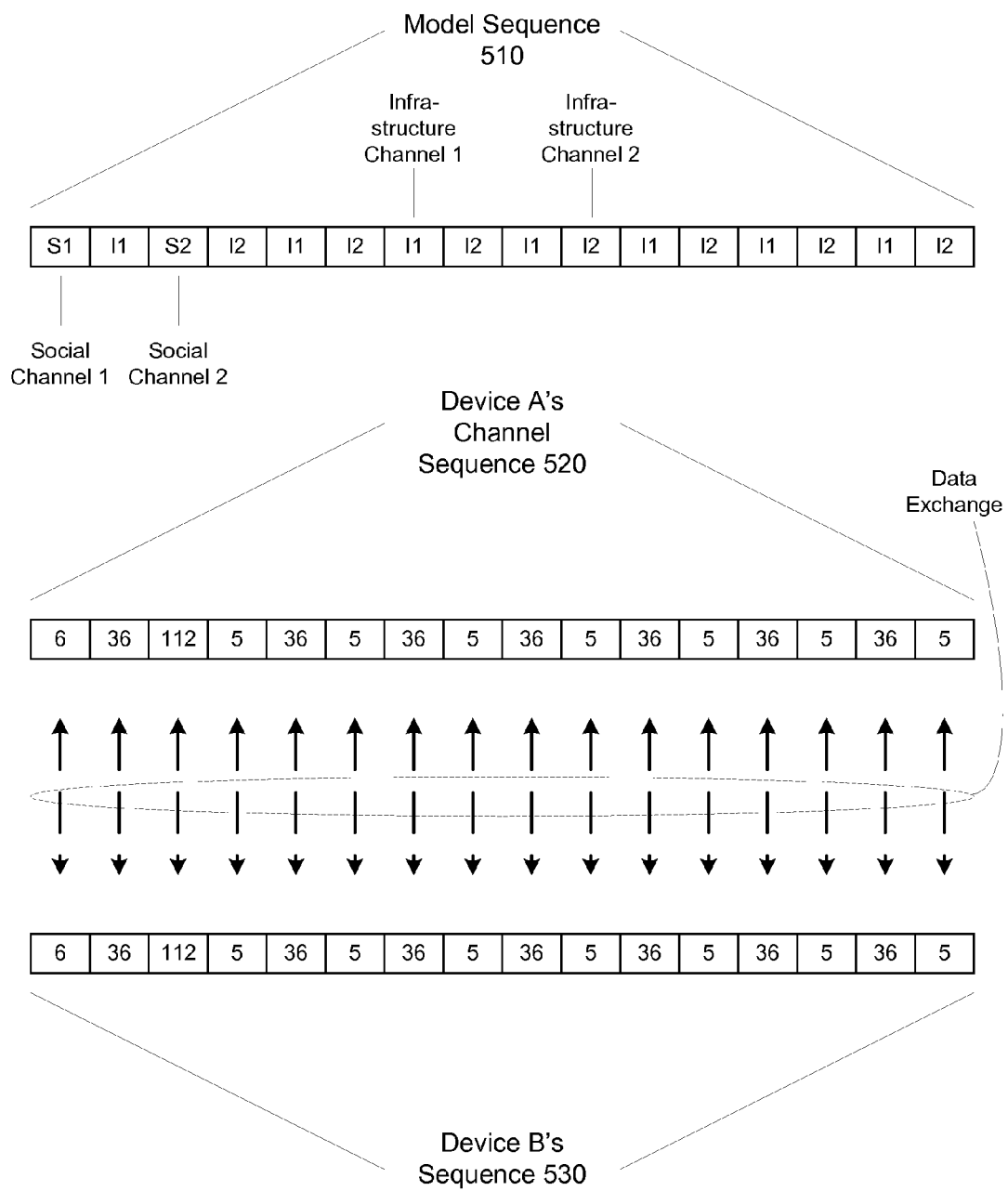
FIG. 5 depicts a schedule of channel switches shared among communicating devices, according to some embodiments.

FIG. 5 depicts a pair of devices sharing a schedule of channel switches, according to some embodiments. In these embodiments, both devices must maintain infrastructure connections and periodically attend social channels, as described above.

However, in these embodiments, instead of meeting on a separate channel (a data channel) to conduct their data exchange, they alternate between their respective infrastructure channels in order to exchange data while accommodating their infrastructure requirements. Therefore, channel sequences 520 and 530 are equivalent and involve two different social channels, as before, and an alternating pattern of infrastructure channel switches.

Devices A and B may be part of the same logical hierarchy, in which case they would periodically tune to social channels 1 and 2 regardless of their data exchange. Alternatively, only one of the devices may be part of the logical hierarchy that uses the social channels, and the other device may tune to the same channels in order to conduct opportunistic data exchange with its communication partner.

In the environment depicted in FIG. 5, data transfer can be conducted during all 16 time slots of a 16-slot schedule, instead of having to pause to accommodate infrastructure requirements. Advantageously, one or more additional devices could participate in the data exchange, each having yet different infrastructure channels to attend, and those channels could be incorporated into the common schedule.

Figure 6:
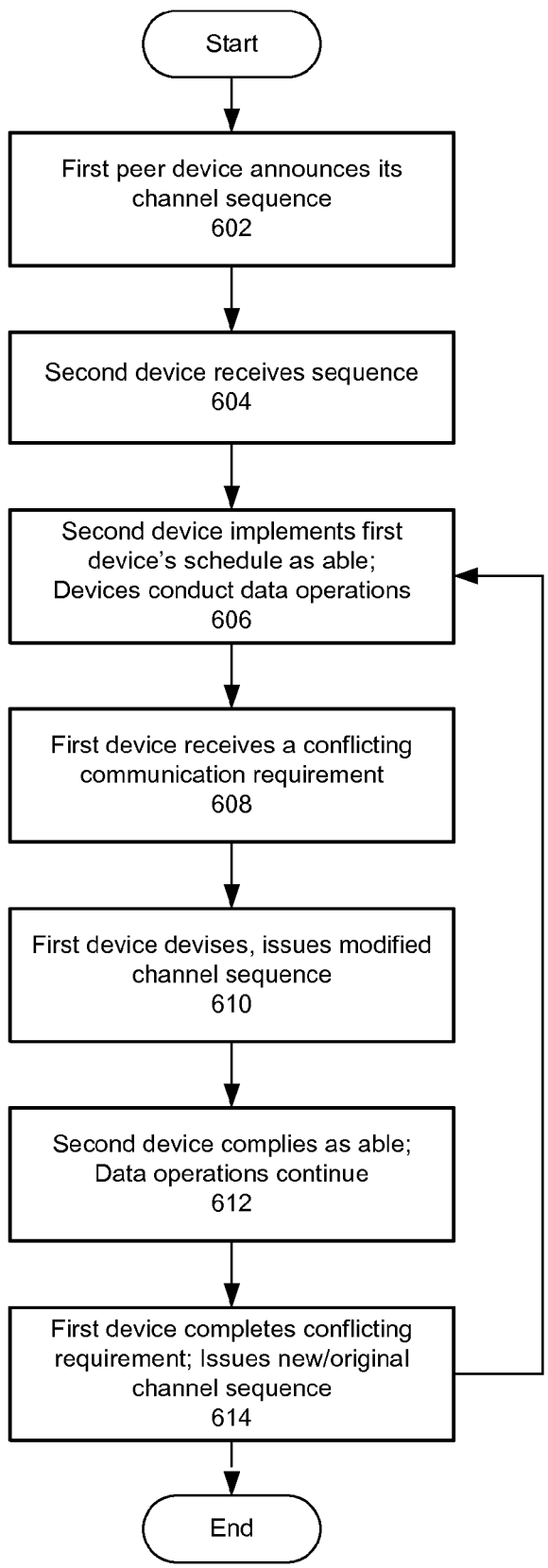
FIG. 6 is a flow chart demonstrating a method of opportunistically multi-tasking during a sequence of channel switches, according to some embodiments.

FIG. 6 is a flow chart demonstrating a method of opportunistically multi-tasking during a sequence of channel switches, according to some embodiments. In these embodiments, mobile computing/communication devices participate in a synchronized peer-to-peer environment as described herein.

In operation 602, a first peer device announces a channel sequence that it will implement. The channel sequence may or may not be repeating, and may be of any length. In some implementations, however, the sequence identifies specific channels that the device will tune to at specified times or time slots, and may provide a time (or an offset to a time) at which the announced sequence will commence.

The peer devices may be operating under one or more communication cycles or sequences involving regular receipt of PSFs (e.g., approximately every 110 ms) to keep the devices synchronized, regular availability windows (e.g., on a periodic basis specified by a synchronization station), etc. The sequence announced by the first device may therefore match a communication cycle already in use, so that it includes multiple time slots and has a total length recognized by other devices. For example, the sequence may be configured to include one or more time slots spent on a social channel (or on multiple social channels) to receive PSFs, any number of time slots allocated to a particular channel (or set of channels) to attend availability windows, other time slots that allow the device to accommodate communication functions unrelated to the peer-to-peer cooperation (e.g., an infrastructure connection), etc.

In different implementations, the first device may broadcast its channel sequence in a PSF (regardless of whether the first device is a synchronization station), as a multicast message during an availability window, as a unicast message to a communication partner, etc. In some embodiments, a non-master's PSFs are sent less often, such as with a period of approximately 430 ms.

In operation 604, a second peer device receives the first device's channel sequence. This may occur because it is listening on a social channel on which the first device broadcasts a PSF, because it is attending an availability window during the first device's announcement, because it is engaged in an ongoing peer-to-peer communication with the first device, etc. The second peer device needs to exchange data with the first device, or is already engaged in a data exchange with the first device.

In operation 606, the second device incorporates the first device's schedule into its own channel sequence to the extent it is able. Depending on conflicting communication requirements, the second device may be able to follow some or all of the channel switches the first device will implement, even if they involve changing to a frequency not used as part of the devices' peer-to-peer communication environment.

For example, if the first device's channel sequence involves tuning to an infrastructure channel, scanning one or more Wi-Fi channels, etc., the second device may be able to skip an availability window, reschedule the broadcast of a PSF, or make some other arrangement to allow it to follow the first device as it tunes to a channel not used in the peer-to-peer synchronization.

During operation 606, when the first and second devices are tuned to the same channel they can conduct a data transfer or data exchange.

In operation 608, the first device receives a new communication requirement that conflicts with its existing channel sequence. In particular, the new demand requires the device to tune to a channel not used for the peer-to-peer networking.

In operation 610, the first device devises a modified channel sequence that will accommodate the new demand, and announces the modified sequence. Again, this may be done via a multicast message (e.g., a PSF) or a unicast message.

In operation 612, the second device again complies with the modified channel sequence to the extent that it can, in order to continue their data exchange. In the illustrated method, the second device attends at least one time slot during which the first device at least partially satisfies the new, conflicting, communication requirement.

In operation 614, the first device completes that requirement and devises and announces a new or resumed channel sequence—such as the sequence announced in operation 602. After operation 614, the illustrated method may return to operation 606 (e.g., when another conflicting communication requirement is levied), or may end.

A Peer Device

Figure 7:
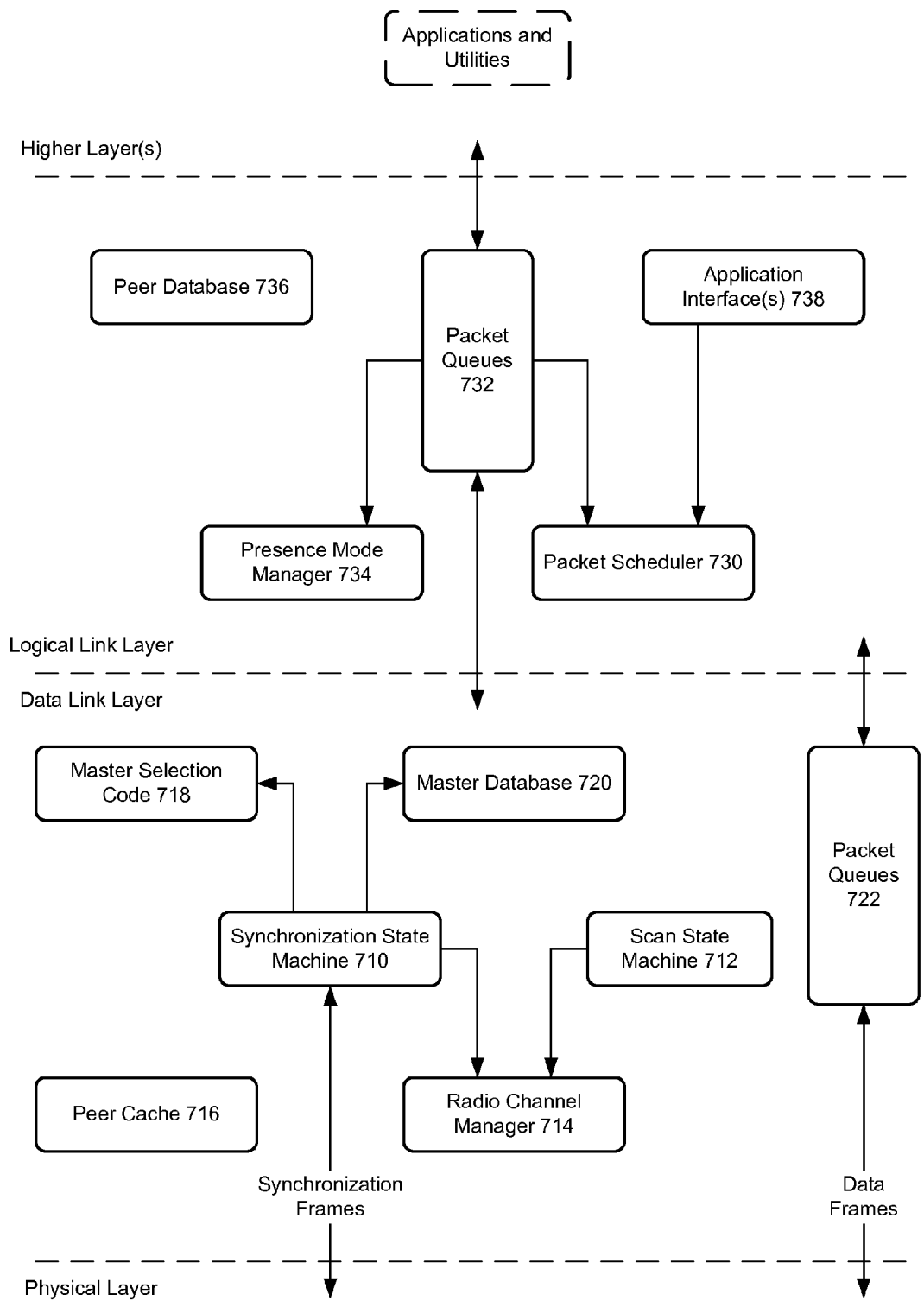
FIG. 7 is a block diagram of a peer device, according to some embodiments.

FIG. 7 is a block diagram of a peer communication device, according to some embodiments. Two primary protocol layers or operating layers are depicted in FIG. 7—the Logical Link Layer and the Data Link Layer. Above the logical link layer one or more applications and/or utilities (e.g., mDNS, Bonjour) may operate; below the data link layer is the Physical Layer, responsible for transmitting frames over, and receiving frames from, the transmission medium.

In some embodiments, the logical link layer and data link layer may be physically implemented by separate processors or by integrated circuits residing on a single component. In the illustrative communication device of FIG. 7, some components of the device are omitted in the interest of clarity, such as processor, memory, display, antenna and communication port components, among others.

Within the data link layer, synchronization frames (e.g., periodic synchronization frames or PSFs, master indication frames or MIFs) are issued by and/or received by synchronization state machine 710. Incoming synchronization frames are routed to master database 720 and then passed upward to the logical link layer. Data frames are handled by packet queues 722.

Synchronization state machine 710 has two modes—leaf and master—and runs continuously in some implementations. As discussed earlier, a master device, also known as a synchronization station, is a device that issues periodic synchronization frames, while a leaf device does not, but is synchronized with a master.

The state machine is responsible for synchronization of the peer device to its current sync station (e.g., if the device is a leaf). If the device is a master, state machine 710 manages its transmission of periodic synchronization frames and/or master indication frames, and also manages its availability window presence.

Scan state machine 712 scans social channels for periodic synchronization frames. Radio channel manager 714 manages radio resources (e.g., a shared antenna) with other entities (e.g., an infrastructure module) and between different radios (e.g., Wi-Fi, Bluetooth). Synchronization state machine 710 interacts with radio channel manager 714 to switch the device's radio to the correct channel for an availability window, at the appropriate time. Scan state machine 712 and/or other components of the device may interact with the radio channel manager for other purposes (e.g., scanning a channel for new devices).

Peer cache 716 stores relevant information of a limited number of other devices with whom the host peer device is communicating or is about to communicate. Use of this cache may help alleviate problems associated with memory restrictions in some hardware/firmware implementations. For example, the data link layer may be implemented by a dedicated Wi-Fi chipset, which typically does not have access to large memory banks Information in peer cache 716 is synchronized with information in peer database 736.

Master selection code 718 is periodically executed to perform a selection process for selecting or identifying synchronization stations, using information from peer database 736 and/or other information. For example, execution of the code may cause a ranking of devices in master database 720, based on their suitability to be a master.

Master database 720 stores data regarding all masters that the peer device is aware of. Such data may be used for synchronization and/or master selection, and may include, but is not limited to, RSSI (Received Signal Strength Indication) (e.g., of the latest frame, average of multiple frames, minimum, maximum), master preference values, selection metrics and synchronization parameters.

In some embodiments, master database 720 is populated or updated, and master selection code 718 executed, upon receipt of every periodic synchronization frame.

Packet queues 722 of the data link layer stores incoming and/or outgoing data frames. Packet queues 732 of the logical link layer store peer traffic incoming from, and outgoing to, other devices.

Packet scheduler 730 schedules multicast, broadcast and unicast traffic to synchronized devices, and out-of-band inquiries/responses to masters with which the peer is not synchronized ("non-synchronized masters") and to devices synchronized with non-synchronized masters. Peer database 736 stores information regarding the non-synchronized masters' availability windows, presence modes and other timing-related information.

Presence mode manager 734 controls the peer device's presence mode, based on factors that may include, but that are not limited to: current active data links to synchronized devices, current data rates to those devices, scan requirements, out-of-band inquiry requirements, power management state, Bluetooth requirements, other radio requirements, etc.

Peer database 736 identifies all devices known to the peer device illustrated in FIG. 7, and stores information regarding each device. This information may include, but is not limited to, its root synchronization station, other masters, master preference values, capabilities (e.g., supported frequency bands, channel bandwidths, modulation/data rates), presence mode, services supported by the device, outstanding block ACK agreements, and so on. Peer database 736 may thus assist in a master selection process by providing a list of candidate devices that can be ordered by preference value.

Application interface(s) 738 include interfaces to higher system layers and modules, which may include but are not limited to: configuration and network management, a GUI (Graphical User Interface), service advertisement and discovery, and so on. The GUI may present a device user with a list of surrounding peers, their physical proximities, range or signal strengths, lists of their service, and/or other information.

The configuration of the peer device presented in FIG. 7 is exemplary. In other embodiments a peer device's configuration may differ to varying degrees. For example, functions of the components of the peer device of FIG. 7 may be combined in a different manner, those of a single component may be subdivided, and/or those of multiple components may be merged.

In some embodiments, a peer device includes an application processor to support applications (e.g., the applications and utilities residing in higher layers in FIG. 7). The application processor provides memory management, graphics processing and/or other functions needed by the applications. The peer device in some embodiments also includes a wireless interface, such as a baseband processor, for performing wireless communications, along with corresponding memory and a transceiver for supporting the wireless communications and communications processing.

The wireless interface may include all of the components depicted in the logical link layer and data link layers of FIG. 7 and the functionality described in conjunction with those components. The wireless interface may also handle some tasks normally associated with the physical layer (e.g., channel coding).

Thus, in some embodiments, a "communication module" or "wireless communication module" of a peer device may refer to a robust wireless interface component described immediately above. In some other embodiments, a communication module may encompass a baseband processor and a corresponding wireless transceiver for operating or managing an antenna of the device, and possibly memory used by the baseband processor. In yet other embodiments, a communication module may encompass the components of the logical link layer and data link layer of FIG. 7, and other components necessary to transmit and receive data to and from the peer device.

Some embodiments promote coexistence of a peer-to-peer communication protocol, as described herein, with other applications that require the radio or other communication resources of a peer device. For example, the device may operate an application or another protocol, such as Bluetooth®.

In these embodiments, Bluetooth communications can be performed as desired, except during the device's availability window and any extensions thereto. Outside of the availability window, Bluetooth scans, inquiries and/or other operations are allowed, and may even take priority over data frames adhering according to a protocol provided here.

A master's periodic synchronization frame may be delayed because of a Bluetooth (or other application/protocol) operation using the device's antenna, but normally will not be dropped. Bluetooth or other operations may not be permitted during out-of-band inquiries and responses.

Synchronization and operation of peer devices as provided herein can also coexist with an application or protocol that relies on some communication infrastructure (e.g., an access point) not part of the peer device hierarchy.

The environment in which some embodiments are executed may incorporate a general-purpose computer or a special-purpose device such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments have been presented for purposes of illustration and description only. They are not intended to be exhaustive or to limit the disclosure to the forms disclosed. Accordingly, many modifications and variations will be apparent to practitioners skilled in the art.

What is claimed is:

1. A device for participating in a peer-to-peer network of communication devices, the device comprising:
   a processor;
   a memory configured to store identifiers of multiple communication channels, including:
      a first channel in use by the device to exchange data with a second device in the peer-to-peer network; and
      one or more other channels the device must switch to in order to perform a scanning operation that involves scanning the one or more channels; and
   a wireless interface for conducting wireless communications;
   wherein the processor and the wireless interface are configured to:
      exchange data with the second device on the first channel;
      switch to the one or more other channels;
      conduct the scanning operation on the one or more other channels, wherein the scanning operation includes receiving one or more Probe Response messages or one or more beacon messages; and
      continue to exchange data with the second device on the one or more other channels.

2. The device of claim 1, wherein the processor and the wireless interface are further configured to:
   synchronize with a plurality of peer devices in the peer-to-peer network, including the second device;
   wherein the scanning operation is separate from synchronization with the plurality of peer devices.

3. The device of claim 1, wherein the processor and the wireless interface are further configured to:
   prior to switching to the one or more other channels, broadcast a sequence of channel switches to be conducted by the device;
   wherein the sequence of channel switches includes the first channel and the one or more other channels.

4. The device of claim 3, wherein broadcasting the sequence of channel switches comprises:
   broadcasting a synchronization frame that identifies the sequence of channel switches and that includes an invitation to the second device to match the channel switches.

5. A method of conducting opportunistic data communications at a first device, the method comprising:
   commencing a data exchange with a second device on a first wireless communication channel;
   receiving a communication demand, separate from the data exchange, that requires switching to a second wireless communication channel different from the first wireless communication channel;
   satisfying the communication demand on the second wireless communication channel; and
   continuing the data exchange on the second wireless communication channel.

6. The method of claim 5, further comprising, prior to receiving the communication demand:
   synchronizing with a logical hierarchy of peer communication devices that includes the second device; and
   implementing a first sequence of channel switches supporting synchronization with the logical hierarchy, wherein the first sequence includes the first wireless communication channel.

7. The method of claim 6, wherein synchronizing with the logical hierarchy comprises:

broadcasting a first periodic synchronization frame that identifies the first sequence of channel switches; and receiving periodic synchronization frames broadcast by one or more of the peer communication devices.

8. The method of claim 6, further comprising, after receiving the communication demand:

devising a second sequence of channel switches supporting satisfaction of the communication demand; and broadcasting a periodic synchronization frame configured to:

identify the second sequence of channel switches; and invite the second device to implement the second sequence of channel switches.

9. The method of claim 5, further comprising, prior to continuing the data exchange:

identifying a sequence of channel switches that includes the first wireless communication channel and the second wireless communication channel; and informing the second device of the sequence of channel switches;

wherein the second device implements at least a portion of the sequence of channel switches.

10. The method of claim 5, wherein:

the first wireless communication channel is a channel on which multiple devices in a synchronized peer-to-peer network environment rendezvous; and the second wireless communication channel is a channel that is not used as part of the synchronized peer-to-peer network environment.

11. The method of claim 5, wherein:

the communication demand is a request to conduct a channel scan on one or more wireless communication channels; and continuing the data exchange includes exchanging data with the second device when not transmitting a probe request or receiving a probe response.

12. The method of claim 5, wherein:

the first wireless communication channel supports a peer-to-peer communication network;

the communication demand includes supporting a first infrastructure communication connection on the second wireless communication channel; and continuing the data exchange comprises:

alternating between the second wireless communication channel and a third wireless communication channel on which the second device is engaged in an infrastructure communication connection; and continuing to exchange data with the second device during said alternating.

13. A method of exchanging data within a peer-to-peer communication network, the method comprising, at a first peer device:

synchronizing with multiple peer devices by congregating with the multiple peer devices on a set of rendezvous channels;

implementing a first sequence of wireless channel switches that includes the set of rendezvous channels;

engaging in a transfer of data with a second peer device on at least one of the rendezvous channels;

receiving a communication requirement separate from the peer-to-peer communication network;

scheduling a second sequence of wireless channel switches that includes one or more channels not used by the peer-to-peer communication network;

advising the second peer device of the second sequence of wireless channel switches prior to implementation of the second sequence of wireless channel switches;

implementing the second sequence of wireless channel switches; and continuing the transfer of data with the second peer device on at least one of the one or more channels.

14. The method of claim 13, further comprising, after satisfaction of the communication requirement:

advising the second peer device of the first sequence of wireless channel switches; and re-implementing the first sequence of wireless channel switches.

15. The method of claim 13, wherein advising the second peer device of the second sequence of wireless channel switches comprises:

generating a synchronization frame configured to:

identify the second sequence of wireless channel switches; and invite peer devices, including the second peer device, to implement the second sequence of wireless channel switches; and broadcasting the synchronization frame on one or more of the rendezvous channels.

16. The method of claim 13, wherein synchronizing with the multiple peer devices comprises:

receiving multiple synchronization frames broadcast by one or more of the multiple peer devices, each said synchronization frame identifying one or more of the rendezvous channels; and tuning to the rendezvous channels at one or more times specified in the multiple synchronization frames;

wherein the multiple peer devices also tune to the rendezvous channels at the one or more times.

17. The method of claim 13, wherein the communication requirement is one of:

conduct a channel scan; and support an infrastructure communication connection.

18. The method of claim 13, wherein:

the communication requirement includes transmitting a Probe Request message on a scan channel; and continuing the transfer of data comprises exchanging data with the second peer device on the scan channel.

19. The method of claim 13, wherein:

the communication requirement includes supporting an infrastructure communication connection; and continuing the transfer of data comprises exchanging data with the second peer device on a scan channel.

20. The method of claim 13, wherein:

the communication requirement includes supporting a first infrastructure communication connection; and continuing the transfer of data includes:

alternating between a first infrastructure communication channel associated with the first infrastructure communication connection and a second infrastructure communication channel associated with an infrastructure communication connection of the second peer device; and continuing the transfer of data on the first infrastructure communication channel and the second infrastructure communication channel.

* * * * *